3,014,810
PIGMENT COMPOSITION AND METHOD
OF MANUFACTURE
Jack N. Dybalski and Donald J. Berenschot, Chicago, and Werner L. Riegler, Western Springs, Ill., assignors, by mesne assignments, to Armour & Company of Delaware, Chicago, Ill., a corporation of Delaware
No Drawing. Filed Sept. 8, 1958, Ser. No. 759,418
18 Claims. (Cl. 106—308)

This invention relates to an improved pigment composition. In one of its aspects, this invention relates to a method for preparing a water-wet pigment for incorporation into an oil system. In another of its aspects this invention relates to the preparation in situ of pigments.

Pigments are finely divided insoluble solids which are used in many materials such as coating compositions, rubber, etc., for many different purposes. In coating compositions they are mostly used to provide a color or hue, but they also function as opacifiers. In rubber, especially tire rubber, carbon black is used to impart strength and abrasion resistance as well as color. It is hardly possible to look around and not see some article which contains a pigment of one sort or another.

In practically every application of pigmentary materials it is necessary that they be dispersed, generally in the liquid medium. Pigment dispersion, as it is encountered in the field of coating compositions, involves generally transferring a dry pigmentary material existing really as a heterogeneous dispersion in air or water to a dispersion in a liquid such as an oil as uniformly as possible. The attainment of optimum dispersion usually results in the maximum practical development of such desirable properties as tinctorial strength, opacity, gloss and uniform pigment particle distribution.

Pigment particles can be pictured as irregularly shaped solids surrounded by a bound envelope of air, gas or moisture which is to be considered distinctly different in its physical relationship to the pigment as compared with the free air that separates the pigment particles. Both the free air and the surface-bound air constitute the initial obstacle to be overcome in converting the pigment from the dispersion in the air to a dispersion in the liquid. Pigments in the dry form are generally in the form of agglomerates which may be either in a relatively loose or a compacted condition. In the dispersion process, a vehicle is added to the pigment mass in a mixing operation which is extended further by a so-called grinding operation. The dispersion processes employed by the manufacturer of coating compositions are not really true grinding operations. They do not reduce the primary particle size of the pigment as originally manufactured, but are intended to approach the primary particle size of the pigment. The tendency of the pigment to cluster or coalesce under the conditions of packing, shipment, and storage, as well as a natural tendency of many pigments to agglomerate when initial wetting is attempted, are factors which lead one to believe that if reduction to primary particle size occurs, it occurs in the dispersion process. Any attempt to truly grind the pigment, if actually accomplished, would probably result in mill scoring, contamination by abrasion, change in color, quality, etc.

As a result of the work done on a mixture of pigment and vehicle, a pigmented composition is obtained which may be represented by two extreme conditions, with, of course, the possibility of an actual composition which combines the characteristics of both. A poor dispersion is one in which the work done has failed to separate the pigment particles with the result that much of the original air is retained and the particles have become tightly packed into a hard aggregate as a consequence of the forces exerted. The ideal result is one in which the pigment particles have been completely separated with an envelope of adsorbed vehicle replacing the original air envelope, and free vehicle displacing the original free air.

Wetting agents are well known in the field of dispersion, and are employed in emulsification as well as in dispersing solids. Since most pigment manufacturing processes involve the formation of the pigment at some stage as a precipitate in an aqueous system, it is known to coat the pigment with a wetting agent to render the pigment surface more oil acceptable. However, most of the pigment wetting agents on the market today are potassium or sodium rosinates and petroleum sulfonates, which rely solely on the partial adsorption of the reagent upon the pigment in water, and are only 50% efficient. These types of compounds generally remain water-soluble, and a large portion is washed away in the filtrate when filtering the pigment.

We have discovered that if an aqueous precipitate of pigmentary materials is treated in such a manner as to ultimately coat the pigment particle with a special type of mixture of cationic surface-active chemicals, which will be described with particularity hereinafter, the coating will remain on the pigment during the filtration step and will act as a spacer between the pigment particle and prevent the formation of clusters of pigment particles or agglomerates. We have also discovered that our special mixture of cationic surface-active chemicals will materially enhance dispersion and prevent pigment agglomeration when incorporated directly into oil systems (in situ) prior to the addition of dry, uncoated pigment. Further, the pigment particles can be "ground" to a finer grind number with fewer passes through the conventional mill than is otherwise required. Also, we have discovered that the pigments coated with our unique mixture are much easier to disperse into plastics and rubber and result in finished products having improved physical properties such as tensile strength, modulus, elongation, hardness, etc. It has also been discovered that rubber containing pigments coated in accordance with our invention exhibit enhanced sunlight aging characteristics as well as some other chemical and physical properties normally associated with rubber and plastics.

It is therefore an object of the present invention to provide an improved pigment composition.

It is a further object of this invention to provide a method for preparing water-wet pigments for incorporation into oil systems.

It is still another object of this invention to provide an improved in situ method for preventing pigment agglomerates.

Further additional objects of this invention will become apparent from the following description:

In one of its aspects, the present invention is applicable to hydrophilic or water-wettable pigments and preferably involves treating a pigment in an aqueous system so as to ultimately coat the pigment particles with from about 0.05 to about 5% by weight of a mixture containing from 0.25 to 10 parts by weight based on the weight of the pigment of a quaternary ammonium compound having the formula

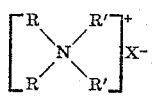

per part of a tertiary aliphatic amine having the formula

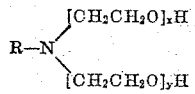

wherein in each of the foregoing formulae R is an aliphatic hydrocarbon radical having from 8 to 22 carbon atoms, R' is a lower alkyl radical having from 1 to 3 carbon atoms, X is a halogen such as chlorine or bromine and $x$ and $y$ are integers of one or more having a sum not greater than 10. In a preferred embodiment of our invention an aqueous slurry of the selected pigment is admixed with from about 0.2 to about 5% by weight of pigment of a mixture containing from 5 to 10 parts by weight of the quaternary ammonium compound described above per part of a water-soluble salt of the tertiary amine described above, such as the acetate or hydrochloride, and agitated for a time sufficient for the mixture to become coated on the pigment particle, usually about 10 to 15 minutes. Next a stoichiometric quantity, or slight excess, of a dilute aqueous solution of a base such as sodium hydroxide or potassium hydroxide required to convert the acetate or hydrochloride salt back to the tertiary amine base in added and the agitation continued until the pigment is uniformly coated with the mixture of quaternary ammonium compound and tertiary amine, and the alkali metal acetate or chloride reaction product is dissolved in the aqueous phase. The coated pigment can then be collected in a filter and dried in an oven at about 60 to 70° C. while the clear filtrate containing the dissolved salt is discarded. The coated pigment is then ready for incorporation into an oil or oleoresinous vehicle and will disperse with far less effort than an uncoated pigment. If the selected pigment is one intended for incorporation into rubber, as coated in accordance with this preferred aspect of the present invention it can be completely dispersed therein with considerably less effort than if it were not coated or if it were coated with conventional materials.

As described hereinabove, the coating composition for pigments of the present invention consists of a mixture of from 0.25 to 10 parts by weight, preferably from 5 to 10 parts by weight, of a quaternary ammonium compound having the formula

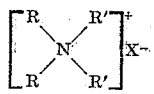

per part of a tertiary aliphatic amine having the formula

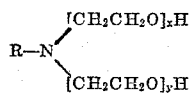

wherein in each of the foregoing formulae R is an aliphatic hydrocarbon radical having from 8 to 22 carbon atoms, R' is a lower alkyl radical having from 1 to 3 carbon atoms, X is a halogen such as chlorine or bromine, and $x$ and $y$ are integers of one or more and having a sum no greater than 10. These compounds can be applied to the pigment either individually or in admixture, although it is preferred to apply them in admixture. When they are applied individually, it is preferred to first coat with the quaternary ammonium compound followed by addition of the tertiary aliphatic amine. It will be appreciated, however, that when the pigments to be coated are in an aqueous system, a water-soluble salt of the tertiary aliphatic amine, such as the acetate or hydrochloride, is first employed followed by conversion with a base such as sodium hydroxide or potassium hydroxide.

In another of its aspects, this invention contemplates in situ coating of pigments. This method involves the direct addition of the above-described special cationic surface-active chemical combination into organophilic media such as oil systems, oleoresinous materials, rubber, and plastics. This novel technique of pre-treating the organophilic substance permits either a dry pigment addition or direct flushing of a water-wet pigment cake, and can be employed to attain excellent dispersion, fineness of grind and extended shelf-life with little or no segregation or separation.

The quantity of the mixture coated upon the pigment in accordance with the practices of this invention will vary between about 0.05 and 5 weight percent based on the weight of dry pigment, although the end use of the pigment will have a relation to the quantity employed. For example, when the pigment is to be used in coating compositions, it is preferred to employ approximately from 0.5 to 5 weight percent of coating on the pigment particle. When the pigment is to be incorporated into a rubber or plastic composition, it is preferred to employ from about 0.2 to about 1% by weight of coating. With respect to the latter end use of the pigment, higher quantities of the coating material usually will have an adverse effect upon the properties of the finished rubber or plastic composition. With respect to the use of the coated pigments for incorporation into coating compositions, higher quantities than 5% by weight can be employed although there is no beneficial effect gained from such higher quantities.

We have discovered that with regard to the quaternary ammonium compounds employed in the described mixture, it is necessary that the compound have two long chain aliphatic hydrocarbon groups rather than only one. When the quaternary ammonium compound employed has only one aliphatic hydrocarbon group the pigment is not effectively coated to convert it completely from a hydrophilic to a hydrophobic particle. Further, we have found that when the quaternary ammonium compound is employed by itself rather than in combination with the tertiary aliphatic amine, the coating process is much less effective. It is also important in achieving the beneficial results of the present invention that the tertiary aliphatic amine contains not more than 10 moles of condensed ethylene oxide. If more than this quantity of ethylene oxide is present the tertiary aliphatic amine becomes fairly water-soluble and is leached away from the coated pigment particles by the aqueous phase, or alternatively, it is not effectively coated upon the pigment particle in an aqueous system.

Quaternary ammonium compounds useful in accordance with the present invention can be represented by the formula

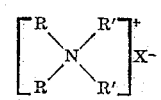

wherein R is an aliphatic hydrocarbon radical having from 8 to 22 carbon atoms, R' is a lower alkyl radical having from 1 to 3 carbon atoms and X is a halogen such as chlorine or bromine. Examples of hydrocarbon radicals coming within the definition of R include octyl, decyl, dodecyl, tetradecyl, hexadecyl, octadecyl, octadecenyl, octadecadienyl, and octadecatrienyl radicals. R can also represent the statistical mixtures of the foregoing aliphatic hydrocarbon radicals as are contained in naturally occurring fats and oils such as tallow, soybean oil, coconut oil, cottonseed oil, and the like. Examples of lower alkyl radicals coming with the definition of R' include methyl, ethyl and propyl. Specific examples of preferred quaternary ammonium compounds include disoya dimethyl ammonium chloride, dicoco dimethyl ammonium chloride, dioctadecyl dimethyl ammonium chloride, dihexadecyl dimethyl ammonium chloride and didodecyl dimethyl ammonium chloride. The first two members of the preceding series are sold commercially under the trade name Arquad 2S and Arquad 2C.

The tertiary aliphatic amine employed in accordance with the present invention can be represented by the formula

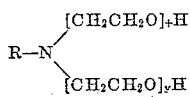

wherein R is a long chain aliphatic hydrocarbon radical having from 8 to 22 carbon atoms and $x$ and $y$ are integers of at least one and having a sum not in excess of 10. Examples of aliphatic hydrocarbon radicals coming within the definition of R include octyl, decyl, dodecyl, tetradecyl, hexadecyl, octadecyl, octadecenyl, octadecadienyl, and octadecatrienyl radicals. R can also connote statistical mixtures of the foregoing aliphatic hydrocarbon radicals as contained in naturally occurring fats and oils such as tallow, soybean oil, coconut oil, cottonseed oil, and the like. Such statistical mixtures of hydrocarbon radicals are named for the natural occurring fats and oils from which they are obtained, e.g. soya, coco, etc. Examples of preferred tertiary aliphatic amines employed in accordance with the present invention include bis(2-hydroxyethyl) soya amine, bis(2-hydroxyethyl) coco amine, bis (2-hydroxyethyl) oleyl amine, and the like. The first members of the preceding series are available commercially under the trade names Ethomeen S/12 and Ethomeen C/12. Also, similar compounds having 5 moles and 10 moles of ethylene oxide present therein are available commercially under the Ethomeen trade name having a code designation of 15, such as S/15, C/15, and of 20 such as S/20 and C/20.

Examples of preferred mixtures employed in accordance with the present invention include 5 parts by weight of disoya dimethyl ammonium chloride and 1 part of bis (2-hydroxyethyl) soya amine, 5 parts by weight of disoya dimethyl ammonium chloride and 1 part by weight of bis (2-hydroxyethyl) coco amine, and 5 parts by weight of dicoco dimethyl ammonium chloride and 1 part of bis (2-hydroxyethyl) soya amine.

The present invention includes the use of the above-mentioned mixtures of quaternary ammonium compounds and tertiary aliphatic amines for treatment of all pigments, including such materials well known commercially as iron blue, chrome yellow, chrome orange, chrome green, zinc chromate, calcium carbonate, calcium silicate, ultramarine, titanium dioxide, black iron oxide, red iron oxide, zinc oxide, lithopone white lead, azo type toners, aluminum hydrate, lakes, carbon black, zinc sulphide containing pigments, etc. Also within the scope of our invention are the above pigments as they are ultimately coated according to the process of this invention.

By the term pigment we mean substances which are generally considered insoluble in the vehicle as distinguished from dyestuffs which are generally considered soluble. For example, pigments generally have the property of light refractivity, tending to give opacity to the system, whereas dyes generally only have the property of light adsorption, tending to retain the transparency of the system.

The following examples are intended to illustrate the underlying principles of our invention and are not to be construed as unduly limiting:

EXAMPLE I

Several precipitated calcium carbonate pigments were coated by the aqueous slurry method according to the preferred process of this invention as hereinabove described. The hydrophilic pigment was converted to a hydrophobic pigment by the addition of a water dispersible or soluble material that was converted to an oil soluble form by the addition of a second water-soluble material, and a resulting molecular interchange.

These coated pigments were evaluated in rubber and plastics to determine if they impart any advantages in processing and reinforcing. Power consumption, physical properties, aging characteristics etc., were used to evaluate the effectiveness of the coated pigment.

The following are the recipes used to evaluate the effectiveness of the coated pigment in rubber.

| GR-S formula: | Parts |
|---|---|
| (1) GR-S 1502 (polymer) | 100.00 |
| (2) Cumar MH #1 (hydrocarbon resin) | 20.00 |
| (3) Zinc oxide | 5.00 |
| (4) Stearic acid | 1.00 |
| (5) Agerite alba (hydroquinone monobenzyl ether) | 0.50 |
| (6) Altax (benzothiazyl disulfide) | 1.50 |
| (7) Thiuram M (tetramethyl-thiuram-disulfide) | 0.35 |
| (8) Calcium carbonate pigment | 125.00 |
| (9) Sulfur | 2.50 |
| Total | 255.85 |

| Natural rubber formulation: | |
|---|---|
| (1) Smoked sheet #1 | 100.00 |
| (2) Zinc oxide | 5.00 |
| (3) Stearic acid | 1.00 |
| (4) P.B.N.A. (phenyl-beta-naphthylamine) | 0.50 |
| (5) Thiuram M | 0.10 |
| (6) Altax | 1.00 |
| (7) Calcium carbonate pigment | 75.00 |
| (8) Sulfur | 2.50 |
| (9) Agerite alba (hydroquinone monobenzyl ether) | 0.25 |
| Total | 185.35 |

The method used for evaluating the various filters was the master batch technique. All of the ingredients in the GR-S formulation with the exception of the sulfur and calcium carbonate were master batched. The natural rubber formulation was processed in the same manner. It is believed this technique eliminates the possibility of error, such as improved physical properties of one of the compounds, due to prevulcanization during processing. Results are tabulated below:

Table I.—Ultra fine particle size $CaCO_3$

| Type of Coating | None | Arquad 2C-Ethomeen S/12 Acetate | Arquad 2C-Ethomeen S/12 Acetate | Arquad 2C-Ethomeen S/12 Acetate |
|---|---|---|---|---|
| Amount of Coating, Percent of $CaCO_3$ | | 0.25 | 0.50 | 1.0 |
| Density, lbs./cu. ft. | 20.7 | 33.3 | 34.5 | 35.3 |
| Linseed Oil Absorption, cc./100 gms. $CaCO_3$ | 75 | 75 | 85 | 90 |
| Incorporation Time in Minutes [1] | 15 | 9:30 | 9:45 | 12 |

[1] Time required to mill 100 parts of pigment per 100 parts of rubber hydrocarbon in standard recipes.

Table II.—*Physical tests on ultra fine particle size CaCO₃ in the natural rubber formulation*

| Compound | Time, Min. | ° F. | Mod. at 300%, p.s.i. | Tensile, p.s.i. | Percent Elong. | Shore Hardness A | Lbs. Tear |
|---|---|---|---|---|---|---|---|
| No Coating | 10 | 287 | 845 | 2,405 | 540 | 59 | 333 |
|  | 15 | 287 | 820 | 2,330 | 545 | 57 |  |
|  | 20 | 287 | 780 | 2,335 | 540 | 56 |  |
| 0.25% of Arquad 2C-Ethomeen S/12 Acetate | 10 | 287 | 1,015 | 2,450 | 505 | 63 | 331 |
|  | 15 | 287 | 980 | 2,545 | 535 | 63 |  |
|  | 20 | 287 | 940 | 2,485 | 525 | 61 |  |
| 0.5% of Arquad 2C-Ethomeen S/12 Acetate | 10 | 287 | 1,155 | 2,295 | 460 | 66 | 452 |
|  | 15 | 287 | 1,105 | 2,330 | 465 | 68 |  |
|  | 20 | 287 | 1,045 | 2,220 | 465 | 65 |  |
| 1.0% of Arquad 2C-Ethomeen S/12 Acetate | 10 | 287 | 1,265 | 2,135 | 425 | 67 | 337 |
|  | 15 | 287 | 1,275 | 2,375 | 460 | 68 |  |
|  | 20 | 287 | 1,165 | 2,230 | 450 | 66 |  |

The optimum cure for each of the above compounds were tested for sunlight aging.

The compounds were tested according to ASTM designation: D1148-55 for 100 hrs. of continual exposure.

In all cases, the compounds containing the calcium carbonate with our coating were superior in color to the compounds containing non-coated or fatty acid coated carbonate pigment.

EVALUATION OF POWER CONSUMPTION

A recording wattmeter was installed in the line which supplies the electric current to the motor that drives a two roll rubber mill.

The amount of power consumed was determined while dispersing each of the four pigments of the very fine particle size calcium carbonates into a standard rubber recipe. The power consumed was reported as kilowatt hours along with the percent power savings that are realized when the pigment is coated with the materials of this invention.

Table III.—*Very fine particle size CaCO₃*

| Type of Coating | I None | II Arquad 2S-Ethomeen S/12 Acetate | III Arquad 2C-Ethomeen S/12 Acetate | IV Arquad 2HT-Ethomeen S/12 Acetate |
|---|---|---|---|---|
| Amount of Coating, percent |  | 0.50 | 0.50 | 0.50 |
| Total Kilowatt Hours [1] | .228 | .194 | .180 | .188 |
| Percent Power Savings [2] |  | 14.9 | 21.0 | 17.5 |

[1] Total kilowatt hours=the amount of power required to disperse the filler into the standard rubber formulation.
[2] Percent Power Savings=the amount of power required to disperse the coated pigment substracted from amount of power required to disperse uncoated pigment gives amount of power saved, this product divided by the amount of power required to disperse uncoated pigment gives the percent power saved.

The above data indicate power savings are realized with each quaternary ammonium compound employed in the mixture.

EXAMPLE II

The pigments coated in accordance with the procedure of Example I were evaluated in polyvinylchloride resins. The evaluation consisted of determining the effect of the coated pigments upon the viscosity of the plastisol and the physical properties of the fused plastisol film.

The following is the formulation used for the evaluation:

| | Parts |
|---|---|
| Polyvinyl chloride resin (Geon 121) | 100.0 |
| Dioctyl phthalate (plasticizer) | 65.0 |
| Vanstay "S"[1] stabilizer | 2.5 |
| Vanstay "R"[2] stabilizer | 2.5 |
| Calcium carbonate pigment | 10.0 |
| Total | 180.0 |

[1] Organic borate, phosphite epoxy complexes.
[2] Organic salts of barium and cadmium.

The following plastisols were prepared using the above formulation:

| Plastisol | A | B | C |
|---|---|---|---|
| Contains | uncoated CaCO₃ pig. | 0.50% coated CaCO₃ pig. | 1.0% coated CaCO₃ pig. |

It was found that the coated pigments dispersed into the plasticizer in less time than was required to disperse the uncoated pigments.

The following data is the original viscosity of the three plastisols. This measurement was made 1 hour after the plastisols were deaerated.

The viscosities were determined with a Brookfield viscosimeter at 75° F. using a #5 spindle and 20 r.p.m.

Plastisol: Centipoises, ° F.
A _____ 5500—75
B _____ 4800—75
C _____ 4700—75

The three plastisols were aged at room temperature for a period of two weeks. At the end of this aging period, a low shear rheology study was used to determine the flow characteristics of each of the plastisols.

The following data is the results of the rheology study. A variable speed Brookfield viscosimeter was used for this study.

All viscosities measured at 75° F. using a number 5 spindle.

| Plastisol | Speed (Rev. per min.) | | | | | | | |
|---|---|---|---|---|---|---|---|---|
|  | 2 | 4 | 10 | 20 | 20 | 10 | 4 | 2 |
| A—control | 14,000 | 12,500 | 10,880 | 9,800 | 9,800 | 10,000 | 11,500 | 13,200 |
| B—0.5% coating | 10,200 | 9,000 | 7,760 | 7,080 | 7,080 | 7,000 | 7,800 | 9,000 |
| C—1.0% coating | 8,400 | 7,500 | 6,600 | 6,100 | 6,100 | 6,000 | 6,800 | 7,800 |

Viscosity reported in centipoises.

After several weeks of aging the plastisol containing the uncoated calcium carbonate was very thick and would not pour from its container, but the other two plastisols containing the coated pigments were still fluid.

A portion of the plastisols were fused into solid sheets at the end of their two week aging period. The standard tensile, modulus, elong., etc., were used to measure their physical properties, and sunlight aging, and extraction test were used to determine their aging characteristics.

The following are the results:

*Physical properties*

| Plastisol | Modulus 100% | Tensile, p.s.i. | Percent Elong. | Hardness Shore-A | Percent Volatility |
|---|---|---|---|---|---|
| A—control | 415 | 2,180 | 415 | 73 | 1.96 |
| B—0.5% coating | 835 | 2,075 | 390 | 75 | 1.90 |
| C—1.0% coating | 930 | 2,195 | 395 | 75 | 1.92 |

*Aging Characteristics*

| Plastisol | Ultra Violet, 200 hrs. continuous exposure | | | Percent Extraction, 50° C. | | |
|---|---|---|---|---|---|---|
| | Discoloration | Surface Condition | Embrittlement | $H_2O$ | Soap | Mineral Oil |
| A—control | poor | good | slight | 0.37 | 3.65 | 6.92 |
| B—0.5% coating | do | do | do | 0.03 | 1.09 | 9.40 |
| C—1.0% coating | do | do | do | 0.07 | 0.99 | 10.34 |

EXAMPLE III

Chrome green, toluidine red, and iron blue pigments were coated with the compounds of this invention both by the precoating and in situ methods. These pigments along with an uncoated control were made into fairly high pigmented roller mill pastes and passed over a laboratory roller mill. A determination was made of grinding time and the number of passes required to produce an enamel grind. Table I includes the results of the roller mill data obtained.

*Table I*

| | Chrome Green (Medium Texture)—Arquad 2S-Ethomeen S/12 | | | Toluidine Red—Arquad 2S-Ethomeen S/12 | | | Iron Blue (Milori) (Medium Hard Texture)—Arquad 2S-Ethomeen S/12 | | |
|---|---|---|---|---|---|---|---|---|---|
| | Control | Coating | In Situ | Control | Coating | In Situ | Control | Coating | In Situ |
| Percent Pigment | 40 | 40 | 40 | 40 | 40 | 40 | 40 | 40 | 40 |
| Percent Vehicle (Varnish Linseed Oil) | 60 | 60 | 60 | 60 | 60 | 60 | 60 | 60 | 60 |
| Percent Additive (Basis Wt. Pigment) | | 3 | 3 | | 3 | 3 | | 3 | 3 |
| Grind No. Before Grinding | 0 | 1 | 0 | 2.5 | 1.5 | 0 | 0 | 0 | 0 |
| 1st Pass: | | | | | | | | | |
| Grind Time | 4.3″ | 5.8″ | 4.8″ | 31.4″ | 12″ | 24.3″ | 10.2″ | 1′6.3″ | 19 |
| Grind No | 1.5 | 3 | 2.5 | 2.5 | 5.5 | 5 | 0 | 1 | 3 |
| 2nd Pass: | | | | | | | | | |
| Grind Time | 5.7″ | 6.2″ | 5.3″ | 30.5″ | 18.7″ | 23.8″ | 10.0″ | 1′27″ | 22.6″ |
| Grind No | 3.5 | 5 | 4.5 | 4.5 | 6.5 | 6 | 2 | 5.5 | 4.5 |
| 3rd Pass: | | | | | | | | | |
| Grind Time | 6.5″ | 6.8″ | 6.2″ | 28.6″ | 14.7″ | 22.7″ | 10.0″ | 1′26″ | 27.7″ |
| Grind No | 4 | 6.5 | 5 | 5 | 7.5 | 6.5 | 3 | 7.5 | 6.0 |
| Roller Clearance: | | | | | | | | | |
| Front (Inches) | 0.010 | 0.010 | 0.010 | 0.010 | 0.010 | 0.010 | 0.010 | 0.010 | 0.010 |
| Back (Inches) | 0.015 | 0.015 | 0.015 | 0.015 | 0.015 | 0.015 | 0.015 | 0.015 | 0.015 |

No sweating period allowed for above pigment oil pastes.
Average grind time for three passes of the iron blue paste control after a 16-hour sweating period=2′18″.
Grind time on iron blue control represents flow of slightly pigmented base linseed oil with major portion of highly agglomerated pigment remaining between rolls 2 and 3.
Grind Time:
    X′00=minutes.
    0XX′=seconds.
    X′XX″=minutes and seconds.
To precoat the pigments Arquad 2S and Ethomeen S/12 acetate were used in a 5=1 ratio. For direct addition to the oil paste (in situ) Arquad 2S and Ethomeen S/12 were used in a 5:1 ratio.

EXAMPLE IV

Precipitated calcium carbonate pigment were coated by the aqueous slurry method hereinabove described with various concentrations of the combined compounds of this invention and tested for hydrophobicity by a simple water float test. Comparative results were obtained with pigment coated only with one of the compounds of this invention. The results are set forth below:

*Table I.—Water float test exhibiting hydrophobicity of calcium carbonate coated pigment*

| Coating Formulation | Elapsed Water Contact Time | Temperature of Slurry, °C. | Percent Wetted |
|---|---|---|---|
| 90.90% Arquad 2C-9.10% Ethomeen S/12 | 7 days | 30 | 12 |
| 83.34% Arquad 2C-16.66% Ethomeen S/12 | do | 30 | 15 |
| 90.90% Arquad 2S-9.10% Ethomeen S/12 | do | 30 | 7 |
| 83.34% Arquad 2S-16.66% Ethomeen S/12 | do | 30 | 15 |
| 90.90% Arquad S-9.10% Ethomeen S/12 | 1 minute | 30 | 100 |

Legend:
    Arquad 2C=Di-coco dimethyl ammonium chloride.
    Arquad 2S=Di-soya dimethyl ammonium chloride.
    Arquad S=N-soya trimethyl ammonium chloride.
    Ethomeen S/12=Bis(2-hydroxyethyl) soya amine.

This data indicates that the compounds in combination exhibit a synergistic effect in that the result achieved is greater than the mere total of the individual effects of the respective compounds. What the exact mechanism of the potentiating or synergistic effect might be, we are unable to explain.

EXAMPLE V

A simple water float test was performed with a chrome green pigment treated in an aqueous system with the Arquad 2S-Ethomeen S/12 combination and compared with an uncoated control. The results are set forth below:

*Table I.—Water float tests*

| Coating Additive | Percent Additive | Temp. of Water, °C. | Elapsed Water Contact Time | Percent Pigment Wetted |
|---|---|---|---|---|
| Control | | 30 | 1 minute | 100 |
| Arquad 2S-Ethomeen S/12 | 3 | 30 | 7 days | 15 |

EXAMPLE VI

To show the physical properties of a natural and synthetic rubber formulation containing an ultrafine precipitated $CaCO_3$, coated pigments were prepared using the water slurry method hereinabove described.

All compounding procedures, methods and evaluations were ASTM procedures. The following were the recipes used for the evaluation of the pigments.

Natural rubber formulation:

| | Parts |
|---|---|
| Smoked sheet #1 | 100.00 |
| Zinc oxide | 5.00 |
| Stearic acid | 1.00 |
| P.B.N.A. (phenyl-beta-naphthylamine) | 0.50 |
| Thiuram M | 0.10 |
| Altax | 1.00 |
| Calcium carbonate pigment | 75.00 |
| Sulfur | 2.50 |
| Antioxidant (hydroquinone mono-benzyl ether) | 0.25 |
| Total | 185.35 |

GR–S formula:

| | Parts |
|---|---|
| GR–S 1502 (polymer) | 100.00 |
| Cumar MH #1 (hydrocarbon resin) | 20.00 |
| Zinc oxide | 5.00 |
| Stearate acid | 1.00 |
| Antioxidant (hydroquinone mono-benzyl ether) | 0.50 |
| Altax (benzothiazyl disulfide) | 1.50 |
| Thiuram M | 0.35 |
| Calcium carbonate (pigment) | 125.00 |
| Sulfur | 2.50 |
| Total | 255.85 |

The evaluations are based on ASTM methods. The sunlight aging test used in this evaluation was D620–49 with a continuous exposure for 200 hours. In each case, the rubbers with the coated calcium carbonates appeared superior in this color test to those compounds containing the non-coated calcium carbonates.

*Table I.—Physical properties of compounded rubbers*

| Type Rubber | Pigment Size, Microns | Coating On Pigment | Cure Time | Temp., °F. | Modulus, p.s.i. at 300% | Tensile, p.s.i. | Percent Elongation Ultimate | Shore Hardness | Lbs. Tear | Sunlight Aging Discoloration |
|---|---|---|---|---|---|---|---|---|---|---|
| S | 0.036–0.040 | None | 10' | 287 | 845 | 2,405 | 540 | 59 | 335 | Good. |
| M | 0.036–0.040 | None | 15' | 287 | 820 | 2,330 | 545 | 57 | 300 | Do. |
| O | 0.036–0.040 | None | 20' | 287 | 780 | 2,235 | 540 | 56 | 285 | Do. |
| K | 0.036–0.040 | (¹) | 10' | 287 | 1,015 | 2,450 | 505 | 63 | 360 | Very Good. |
| E | 0.036–0.040 | (¹) | 15' | 287 | 980 | 2,545 | 535 | 63 | 330 | Do. |
| D | 0.036–0.040 | (¹) | 20' | 287 | 940 | 2,485 | 525 | 61 | 310 | Do. |
| S | 0.036–0.040 | (²) | 10' | 287 | 1,155 | 2,295 | 460 | 66 | 400 | Do. |
| H | 0.036–0.040 | (²) | 15' | 287 | 1,105 | 2,330 | 465 | 68 | 450 | Do. |
| E | 0.036–0.040 | (²) | 20' | 287 | 1,045 | 2,220 | 465 | 65 | 365 | Do. |
| E | 0.036–0.040 | (³) | 10' | 287 | 1,265 | 2,135 | 425 | 67 | 330 | Do. |
| E | 0.036–0.040 | (³) | 15' | 287 | 1,275 | 2,375 | 460 | 68 | 340 | Do. |
| T | 0.036–0.040 | (³) | 20' | 287 | 1,165 | 2,230 | 450 | 66 | 340 | Do. |

¹ 0.25% of a 83.34% Arquad 2C-16.66% Ethomeen S/12 blend.
² 0.5% of a 83.34% Arquad 2C-16.66% Ethomeen S/12 blend.
³ 1.0% of a 83.34% Arquad 2C-16.66% Ethomeen S/12 blend.

*Table II.—Physical properties of compounded rubbers*

| Type Recipe | Pigment Size, Microns | Coating On Pigment | Cure Time | Temp., °F. | Modulus, p.s.i. at 300% | Tensile, p.s.i. | Percent Elongation Ultimate | Shore Hardness | Lbs. Tear | Sunlight Aging Discoloration |
|---|---|---|---|---|---|---|---|---|---|---|
| GR–S | .036–.040 | None | 7½' | 307 | 260 | 1,490 | 660 | 54 | 245 | Good. |
| GR–S | .036–.040 | None | 10' | 307 | 320 | 1,715 | 565 | 57 | 270 | Do. |
| GR–S | .036–.040 | None | 15' | 307 | 375 | 1,520 | 540 | 58 | 200 | Do. |
| GR–S | .036–.040 | (¹) | 7½' | 307 | 790 | 1,230 | 360 | 66 | 165 | Very Good. |
| GR–S | .036–.040 | (¹) | 10' | 307 | 815 | 1,185 | 335 | 67 | 210 | Do. |
| GR–S | .036–.040 | (¹) | 15' | 307 | 780 | 1,120 | 340 | 66 | 190 | Do. |
| GR–S ² | .036–.040 | (¹) | 7½' | 307 | 635 | 1,215 | 410 | 65 | 210 | Do. |
| GR–S ² | .036–.040 | (¹) | 10' | 307 | 685 | 1,160 | 355 | 66 | 190 | Do. |
| GR–S ² | .036–.040 | (¹) | 15' | 307 | 725 | 1,130 | 340 | 66 | 145 | Do. |

¹ 0.25% of a 83.34% Arquad 2C-16.66% Ethomeen S/12 Acetate blend.
² Contains only ½ of antioxidant shown in recipe.

EXAMPLE VII

To demonstrate that improvements in pigment dispersion are also possible by the in situ coating of calcium carbonate in the rubber matrix, a 5:1 blend of Arquad 2C and Ethomeen S/12 was added to the rubber matrix in a rubber mill, just before the addition of the pigment. Table I shows the improvement in physical properties with in situ coating.

*Table I.—In situ addition of cationic chemicals*

| Ultra Fine Pigment | Rubber | Cure Time, Minutes | Cure Temp., °F. | 300% Modulus | Tensile, p.s.i. | Percent Elong. | Shore Hardness A | Lbs. Tear |
|---|---|---|---|---|---|---|---|---|
| 0.036 Particle Size Non-Coated. | Natural | 10 | 287 | 845 | 2,405 | 540 | 59 | 335 |
| | | 15 | 287 | 820 | 2,330 | 545 | 57 | 300 |
| | | 20 | 287 | 780 | 2,235 | 540 | 56 | 285 |
| Precoated Pigment, 1% of Arquad 2C-Ethomeen S/12 Acetate. | do | 10 | 287 | 1,265 | 2,135 | 425 | 67 | 330 |
| | | 15 | 287 | 1,275 | 2,375 | 460 | 68 | 340 |
| | | 20 | 287 | 1,165 | 2,230 | 450 | 66 | 340 |
| In Situ Coating, 1% of of Arquad 2C-Ethomeen S/12. | do | 10 | 287 | 1,330 | 2,380 | 435 | 66 | 300 |
| | | 15 | 287 | 1,320 | 2,475 | 460 | 68 | 320 |
| | | 20 | 287 | 1,250 | 2,120 | 425 | 67 | 320 |

SRF (semi reinforcing furnace) carbon black pigment was coated with 1% of the Arquad 2C-Ethomeen S/12 acetate in a 5:1 ratio in accordance with the aqueous slurry method hereinabove described. The dried pigment was evaluated against an equivalent amount of uncoated pigment to determine the incorporation time required to disperse the pigment into the rubber formulations given in Example I. The coated pigment dispersed into the rubber formulations in 25% less time than required to disperse the uncoated pigment.

EXAMPLE IX

SRF carbon black pigment was coated as described in Example VIII. The coated pigment and an uncoated pigment were incorporated into PVC (polyvinyl chloride) plastisol having the following formulation:

| | Parts |
|---|---|
| PVC resin (polyvinyl chloride) | 88.20 |
| DOP (dioctyl phthalate) | 57.45 |
| Vanstay S and R (heat and light stabilizer) | 4.35 |
| SRF carbon black | 1.00 |
| Total | 151.00 |

The advantages of the formulation containing the coated pigment were as follows:

(1) Improved dispersion of the carbon black.
(2) Greater viscosity stability than the control.
(3) Improved anti-static properties of the fused plastisol film.

EXAMPLE X

Employing the GRS formulation set out in Example I, carbon black pigment coated with the combination of Arquad 2C-Ethomeen S/12 acetate in 5:1 ratio was compared with a control and the formulation containing carbon black pigment coated with Arquad 2C alone. The results obtained are set out in Table I.

Table I

| | Time in Min. | Modulus 300%, p.s.i. | Tensile, p.s.i. | Percent Elongation | Shore (A) Hardness |
|---|---|---|---|---|---|
| Control | 15 | 330 | 435 | 395 | 60 |
|  | 20 | 300 | 375 | 345 | 61 |
| .5% Arquad Alone [1] | 15 | 335 | 480 | 370 | 62 |
|  | 20 | 320 | 430 | 350 | 62 |
| .5% Combination 5:1 | 15 | 415 | 485 | 340 | 63 |
|  | 20 | 365 | 415 | 330 | 63 |

[1] The .5% refers to the weight of coating on the pigment.

Although this invention has been described and exemplified in terms of its preferred embodiments, those skilled in the art will appreciate that many changes can be made without departing from the spirit and scope of the invention.

We claim:

1. A pigment particle uniformly coated with from 0.05 to 5 weight percent based on the weight of dry pigment of a mixture consisting essentially of from 0.25 to 10 parts of a quaternary ammonium compound having the formula

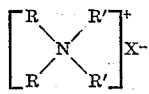

per part of a tertiary aliphatic amine having the formula

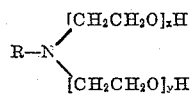

wherein in each of the foregoing formulae R is an aliphatic hydrocarbon radical having from 8 to 22 carbon atoms, R' is a lower alkyl radical having from 1 to 3 carbon atoms, X is a halogen selected from the group consisting of chlorine and bromine and $x$ and $y$ are integers of 1 or more having a sum of from 2 to 10.

2. A pigment particle uniformly coated with from .05 to 5 weight percent based on the weight of dry pigment of a mixture consisting essentially of from 5 to 10 parts by weight of a quaternary ammonium compound having the formula

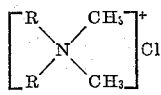

per part of a tertiary aliphatic amine having the formula

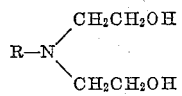

wherein R in each of the foregoing formulae is an aliphatic hydrocarbon radical having from 8 to 22 carbon atoms.

3. A pigment particle uniformly coated with from .05 to 5 weight percent based on the weight of dry pigment of a mixture consisting essentially of from 5 to 10 parts by weight of disoya dimethyl ammonium chloride per part of bis(2-hydroxyethyl) soya amine.

4. A pigment particle uniformly coated with from 0.05 to 5 weight percent based on the weight of dry pigment of a mixture consisting essentially of from 5 to 10 parts by weight of dicoco dimethyl ammonium chloride per part of bis(2-hydroxyethyl) soya amine.

5. A calcium carbonate pigment particle uniformly coated with from 0.05 to 1.0 weight percent based on the weight of dry pigment of a mixture consisting essentially of from 5 to 10 parts by weight of a quaternary ammonium compound having the formula

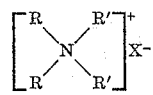

per part of a tertiary aliphatic amine having the formula

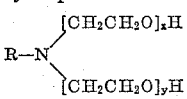

wherein in each of the foregoing formulae R is an aliphatic hydrocarbon radical having from 8 to 22 carbon atoms, R' is a lower alkyl radical having from 1 to 3 carbon atoms, X is a halogen selected from the group consisting of chlorine and bromine, and $x$ and $y$ are integers of at least 1 and having a sum of from 2 to 10.

6. A calcuim carbonate pigment according to claim 5 uniformly coated with a mixture consisting of 5 parts of disoya dimethyl ammonium chloride per part of bis(2-hydroxyethyl) soya amine.

7. An iron blue pigment coated according to claim 1.

8. A chrome green pigment coated according to claim 1.

9. A toluidine red pigment according to claim 1.

10. A process comprising adding with agitation to an aqueous pigment system from 0.05 to 5 weight percent based on the amount of dry pigment of a mixture consisting essentially of from 5 to 10 parts by weight of a quaternary ammonium compound having the formula

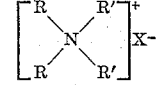

per part of a water-soluble salt of a tertiary aliphatic amine having the formula

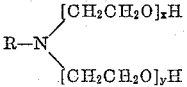

wherein in each of the formulae R is an aliphatic hydrocarbon radical having from 8 to 22 carbon atoms, R' is a lower alkyl radical having from 1 to 3 carbon atoms, X is a halogen selected from the group consisting of chlorine and bromine, and $x$ and $y$ are integers of at least 1 and having a sum of from 2 to 10; adding with agitation to the aqueous mixture an equivalent amount of a dilute solution of an alkali metal hydroxide to convert the tertiary aliphatic amine salt on the pigment particle to the tertiary aliphatic amine and to dissolve the resulting alkali metal salt reaction product in the aqueous phase; and separating the thus coated pigment from the aqueous phase.

11. A process comprising adding with agitation to an aqueous pigment system from 0.05 to 5 weight percent based on the amount of dry pigment of a mixture consisting essentially of from 5 to 10 parts by weight of a quaternary ammonium compound having the formula

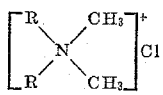

per part of a water-soluble salt of a tertiary aliphatic amine having the formula

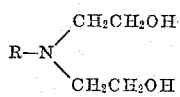

wherein in each of the formulae R is an aliphatic hydrocarbon radical having from 8 to 22 carbon atoms; adding with agitation to the aqueous mixture an equivalent amount of a 1% sodium hydroxide solution to convert the tertiary aliphatic amine salt on the pigment particle to the tertiary aliphatic amine and to dissolve the resulting sodium salt product in the aqueous phase; and separating the thus coated pigment from the aqueous phase.

12. A process comprising adding with agitation to an aqueous pigment system from 0.05 to 5 weight percent based on the amount of dry pigment of a mixture consisting essentially of 5 parts by weight of disoya dimethyl ammonium chloride per part of the acetate salt of bis(2-hydroxyethyl) soya amine; adding with agitation to the aqueous mixture an equivalent amount of a 1% aqueous solution of sodium hydroxide to convert the acetate salt on the pigment particle to the tertiary aliphatic amine and to dissolve the resulting sodium acetate in the aqueous phase; and separating the thus coated pigment from the aqueous phase.

13. A process comprising adding with agitation to an aqueous pigment system from .05 to 5 weight percent based on the amount of dry pigment of a mixture consisting essentially of 5 parts by weight of dicoco dimethyl ammonium chloride per part of the acetate salt of bis(2-hydroxyethyl) soya amine; adding with agitation to the aqueous mixture an equivalent amount of a 1% aqueous solution of sodium hydroxide to convert the acetate salt on the pigment particle to the tertiary aliphatic amine and to dissolve the resulting sodium acetate in the aqueous phase; and separating the thus coated pigment from the aqueous phase.

14. A process comprising adding with agitation to an aqueous pigment system from .05 to 5 weight percent based on the amount of dry pigment of a mixture consisting essentially of 5 parts by weight of dicoco dimethyl ammonium chloride per part of the acetate salts of bis(2-hydroxyethyl) coco amine; adding with agitation to the aqueous mixture an equivalent amount of a 1% aqueous solution sodium hydroxide to convert the acetate salt on the pigment particle to the tertiary aliphatic amine and dissolve the resulting sodium acetate in the aqueous phase; and separating the thus coated pigment from the aqueous phase.

15. A process comprising adding to a substantially non-aqueous pigment vehicle from about 0.05 to about 5 weight percent based on the amount of dry pigment to be added of a mixture consisting essentially of from about 5 to about 10 parts by weight of a quaternary ammonium compound having the formula

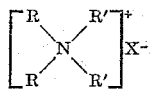

per part of a soluble tertiary aliphatic amine having the formula

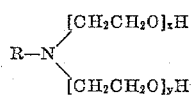

wherein in each of the formulae R is an aliphatic hydrocarbon radical having from 8 to 22 carbon atoms, R' is a lower alkyl radical having from 1 to 3 carbon atoms, X is a halogen selected from the group consisting of chlorine and bromine, and $x$ and $y$ are integers of at least 1 and having a sum of from 2 to 10; and adding pigment to the said vehicle.

16. A process comprising adding to a substantially non-aqueous pigment vehicle from about 0.05 to about 5 weight percent based on the amount of dry pigment to be added of a mixture consisting essentially of from 5 to 10 parts by weight of a quaternary ammonium compound having the formula

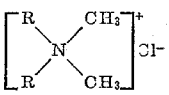

per part of a soluble tertiary aliphatic amine having the formula

wherein in each of the formulae R is an aliphatic hydrocarbon radical having from 8 to 22 carbon atoms; and adding pigment to the said vehicle.

17. A process comprising adding to a substantially non-aqueous pigment vehicle from about 0.05 to about 5 weight percent based on the amount of dry pigment to be added of a mixture consisting essentially of 5 parts by weight of disoya dimethyl ammonium chloride per part of bis(2-hydroxyethyl) soya amine; and adding pigment to the said vehicle.

18. A process comprising adding to a substantially non-aqueous pigment vehicle from about 0.05 to about 5 weight percent based on the amount of dry pigment to be added of a mixture consisting essentially of 5 parts by weight of dicoco dimethyl ammonium chloride per part of bis(2-hydroxyethyl) coco amine; and adding pigment to the said vehicle.

References Cited in the file of this patent

UNITED STATES PATENTS

| | | |
|---|---|---|
| 2,192,956 | Sloan et al. | Mar. 12, 1940 |
| 2,572,217 | Thurmond | Oct. 23, 1951 |
| 2,674,619 | Lundsted | Oct. 19, 1953 |
| 2,681,314 | Skinner et al. | June 15, 1954 |
| 2,754,219 | Voet et al. | July 10, 1956 |
| 2,819,210 | Haden et al. | Jan. 7, 1958 |
| 2,841,504 | Liggett | July 1, 1958 |

OTHER REFERENCES

Fischer et al.: Industrial and Engineering Chemistry, vol. 35, No. 3, March 1943, pages 336-342.